(No Model.)
I. L. STOVER.
SECURING FLUES IN STEAM BOILERS.
No. 265,886. Patented Oct. 10, 1882.
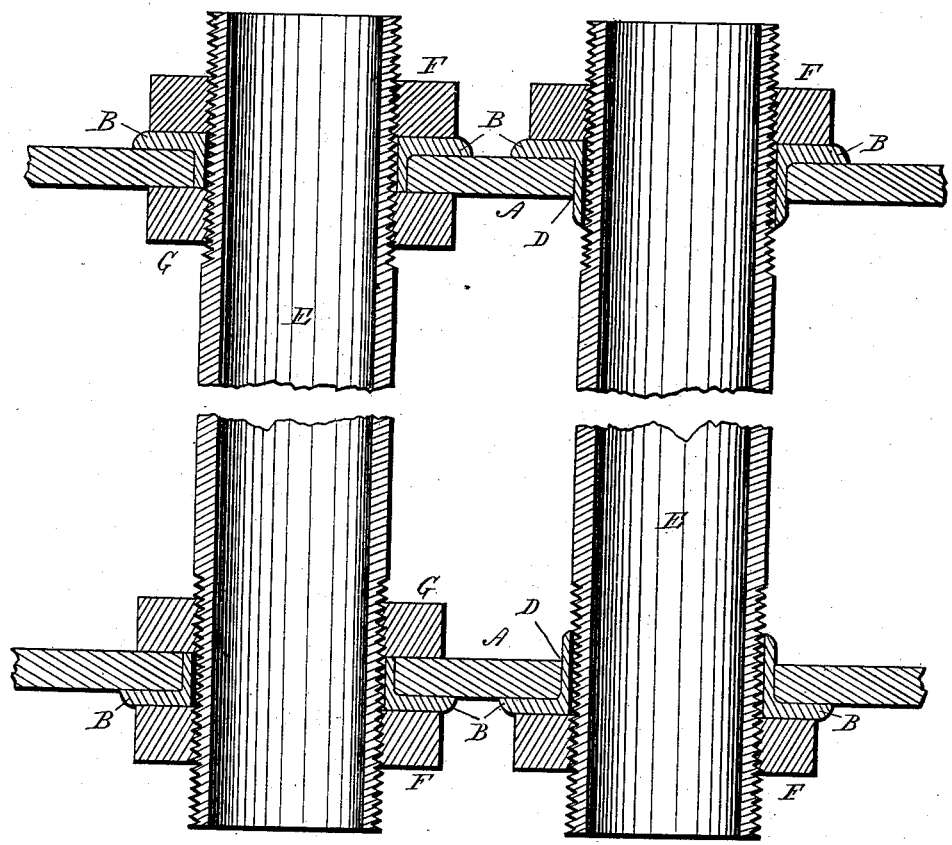
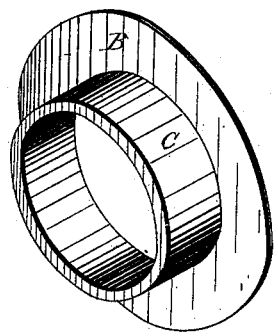
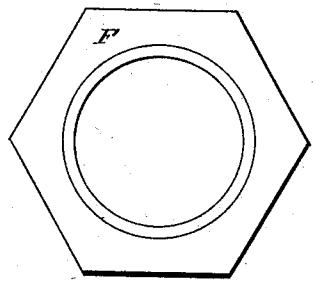
WITNESSES
INVENTOR

UNITED STATES PATENT OFFICE.

ISAAC L. STOVER, OF CENTRALIA, ILLINOIS.

SECURING FLUES IN STEAM-BOILERS.

SPECIFICATION forming part of Letters Patent No. 265,886, dated October 10, 1882.

Application filed September 5, 1882. (No model.)

*To all whom it may concern:*

Be it known that I, ISAAC L. STOVER, a citizen of the United States, residing at Centralia, in the county of Marion and State of Illinois, have invented a new and useful Method of Securing Flues in Steam-Boilers, of which the following is a specification, reference being had to the accompanying drawings.

Figure 1 is a horizontal sectional view of a portion of a boiler illustrating my invention. Fig. 2 is a detail view, in perspective, of the flanged washer; and Fig. 3 is a detail view of the nut.

Corresponding parts in the several figures are denoted by like letters of reference.

This invention relates to an improved method of and means for securing flues in steam-boilers in such a manner that they may be readily detached and replaced as occasion may demand, and it consists in the improved construction and arrangement of parts which will be hereinafter fully described, and particularly pointed out in the claims.

Referring to the drawings hereto annexed, A A represent the flue-sheets of a steam-boiler, which may be of any suitable construction.

B B are rings or washers, made preferably of copper, and provided on their inner or under sides with flanges C, fitting nicely in the openings D in the flue-sheets.

E E represent the flues, which project through and are fitted nicely in the rings or washers B. The ends of the flues are threaded to receive the nuts F, which are screwed down tightly against the washers, thereby holding the flues securely and in such a manner as to form an absolutely-tight joint. One or more of the flues are to be provided inside the boiler with jam-nuts G, which are to be tightened up against the flue-sheet, so as to prevent the latter from springing when the balance of the nuts are tightened from the outside.

I claim and desire to secure by Letters Patent of the United States—

1. In a steam-boiler, the combination, with the flue-sheets, of the flues or tubes having threaded ends, the flanged rings or washers, and the tightening-nuts, as set forth.

2. The combination and arrangement, as described, of the flue-sheets A, flanged rings or washers B, flues E, having threaded ends, tightening-nuts F, and jam-nuts G, as and for the purpose set forth.

In testimony that I claim the foregoing as my own I have hereto affixed my signature in presence of two witnesses.

ISAAC L. STOVER.

Witnesses:
JACOB FRAZIER,
E. S. MORRISON.